(12) United States Patent  (10) Patent No.: US 8,749,146 B2
Jones                     (45) Date of Patent:     Jun. 10, 2014

(54) AUTO COMMISSIONING OF LIGHT FIXTURE USING OPTICAL BURSTS

(71) Applicant: MoJo Labs, Inc., Longmont, CO (US)

(72) Inventor: Morgan Jones, Longmont, CO (US)

(73) Assignee: MoJo Labs, Inc., Longmont, CO (US)

( * ) Notice: Subject to any disclaimer, the term of this patent is extended or adjusted under 35 U.S.C. 154(b) by 0 days.

(21) Appl. No.: 13/970,424

(22) Filed: Aug. 19, 2013

(65) Prior Publication Data

US 2013/0334971 A1    Dec. 19, 2013

Related U.S. Application Data

(63) Continuation-in-part of application No. 13/913,157, filed on Jun. 7, 2013, and a continuation-in-part of application No. 13/310,911, filed on Dec. 5, 2011.

(51) Int. Cl.
    *H05B 37/02* (2006.01)

(52) U.S. Cl.
    USPC .......................... 315/151; 315/149; 315/150

(58) Field of Classification Search
    CPC ............... H05B 33/0869; H05B 37/02; H05B 37/0272; H05B 37/0218
    USPC .................................................. 315/149–151
    See application file for complete search history.

(56) References Cited

U.S. PATENT DOCUMENTS

| 5,812,422 | A | 9/1998 | Lyons |
| 6,340,864 | B1 | 1/2002 | Wacyk |
| 6,741,351 | B2 | 5/2004 | Marshall et al. |
| 7,570,246 | B2 | 8/2009 | Maniam et al. |
| 7,583,901 | B2 | 9/2009 | Nakagawa et al. |
| 7,926,300 | B2 | 4/2011 | Roberts et al. |
| 7,952,292 | B2 | 5/2011 | Vegter et al. |
| 8,305,014 | B1 | 11/2012 | Li et al. |
| 8,330,395 | B2 | 12/2012 | Hoschopf |
| 8,410,706 | B2 | 4/2013 | Steiner et al. |
| 2006/0087841 | A1 | 4/2006 | Chern et al. |
| 2007/0058987 | A1 | 3/2007 | Suzuki |
| 2008/0203273 | A1 | 8/2008 | Deurenberg |
| 2008/0309255 | A1 | 12/2008 | Myers et al. |
| 2008/0310850 | A1 | 12/2008 | Pederson et al. |
| 2009/0200958 | A1 | 8/2009 | Doherty et al. |
| 2009/0245806 | A1 | 10/2009 | Murayama et al. |
| 2010/0007600 | A1 | 1/2010 | Deurenberg et al. |
| 2010/0045191 | A1 | 2/2010 | Aendekerk |
| 2010/0284690 | A1 | 11/2010 | Rajagopal et al. |
| 2010/0327757 | A1* | 12/2010 | Chung et al. .................. 315/158 |
| 2010/0327764 | A1* | 12/2010 | Knapp ........................ 315/250 |

(Continued)

OTHER PUBLICATIONS

U.S. Appl. No. 13/310,911, Jun. 21, 2013, Non-Final OA.

(Continued)

*Primary Examiner* — Jason M Crawford
(74) *Attorney, Agent, or Firm* — Maschoff Brennan

(57) ABSTRACT

Methods and systems herein provide for determining lighting contributions of light fixtures to an environment. In one embodiment, a system includes a light sensor and a controller. The light sensor generates light level data based on measured light levels. The controller determines a nominal light level based on the light level data, and identifies an optical burst pattern in the light level data generated by a light fixture. The controller then determines a lighting contribution of the light fixture based on the optical burst pattern and the nominal light level.

26 Claims, 10 Drawing Sheets

(56) References Cited

U.S. PATENT DOCUMENTS

| | | | |
|---|---|---|---|
| 2011/0018465 A1* | 1/2011 | Ashdown | 315/294 |
| 2011/0031897 A1* | 2/2011 | Henig et al. | 315/297 |
| 2011/0084615 A1 | 4/2011 | Welten | |
| 2011/0115386 A1 | 5/2011 | Delnoij | |
| 2011/0156596 A1* | 6/2011 | Salsbury | 315/152 |
| 2011/0199004 A1* | 8/2011 | Henig et al. | 315/152 |
| 2012/0007511 A1* | 1/2012 | Choong et al. | 315/152 |
| 2012/0091896 A1* | 4/2012 | Schenk et al. | 315/132 |
| 2012/0153838 A1* | 6/2012 | Schenk et al. | 315/151 |
| 2012/0200226 A1* | 8/2012 | Knibbe et al. | 315/151 |
| 2012/0217882 A1* | 8/2012 | Wong et al. | 315/185 R |
| 2012/0281879 A1* | 11/2012 | Vlutters et al. | 382/103 |
| 2013/0069540 A1* | 3/2013 | Schenk et al. | 315/152 |
| 2013/0140995 A1 | 6/2013 | Jones | |
| 2013/0328486 A1 | 12/2013 | Jones | |

OTHER PUBLICATIONS

U.S. Appl. No. 13/310,911, Dec. 17, 2013, Final OA.

Non-Final Office Action from U.S. Appl. No. 13/913,157, issued Mar. 3, 2014, 6 pgs.

Notice of Allowance from U.S. Appl. No. 13/310,911, issued Mar. 10, 2014, 14 pgs.

* cited by examiner

AUTO COMMISSIONING OF LIGHT FIXTURE USING OPTICAL BURSTS

CROSS-REFERENCES TO RELATED APPLICATIONS

This application is a continuation-in-part of, and claims the benefit of, U.S. patent application Ser. No. 13/310,911, entitled "Determination of Lighting Contributions for Light Fixtures Using Optical Bursts," filed Dec. 5, 2011, the entire disclosure of which is incorporated herein by reference for all purposes.

This application is also a continuation-in-part of, and claims the benefit of, U.S. patent application Ser. No. 13/913,157, entitled "Multiple Light Sensor Multiple Light Fixture Control," filed Jun. 7, 2013, the entire disclosure of which is incorporated herein by reference for all purposes.

FIELD

The invention relates to the field of lighting systems and in particular, to identifying how different light sources contribute to lighting in an environment.

BACKGROUND

Modern indoor lighting systems serve a number of purposes, such as providing a comfortable lighting environment for the occupants of a room, and doing so efficiently. The typical indoor lighting environment may include one or more windows that contribute a varying amount of natural light to the environment of the room over time, and a number of light fixtures that provide sources of artificial light. Thus, a person at a workspace may experience periods of above average lighting in the environment and periods of below average lighting in the environment. In addition, different light fixtures placed across the room may provide different contributions to the lighting at the person's workspace. For example, light fixtures near the workspace may provide a larger contribution of lighting at the workspace than light fixtures farther away. Thus, it can be problematic to determine how different light sources (both artificial and natural) contribute to the lighting in the environment.

SUMMARY

Embodiments described herein advantageously utilize burst patterns encoded in the optical output of light fixtures to determine a lighting contribution of the fixtures in an environment. Using this information, various activities may be performed to more efficiently utilize the lighting available. For example, knowing the lighting contribution of various lighting fixtures may allow for a reduction of energy usage in providing an adequate amount of lighting in the environment.

One embodiment is a system comprising a light sensor and a controller. The light sensor generates light level data based on measured light levels. The controller determines a nominal light level based on the light level data, identifies an optical burst pattern in the light level data generated by a light fixture, and determines a lighting contribution of the light fixture based on the optical burst pattern and the nominal light level.

In another embodiment, the controller determines the lighting contribution of the light fixture by calculating a difference between an amplitude of the optical burst pattern and the nominal light level. In this embodiment, the controller may perform an averaging process or some other type of low frequency filtering of the light level data to calculate the nominal light level.

In another embodiment, the controller determines a difference between the nominal light level and a target light level. The controller calculates a change in the optical output of the light fixture based on the lighting contribution of the light fixture and the difference. The controller then generates an instruction to adjust the optical output of the light fixture to reach the target level.

Another embodiment is a system comprising a light source and a controller. The light source generates an optical output. The controller modulates the optical output of the light source to generate an optical bust pattern that is substantially imperceptible. The controller receives information for a lighting contribution of the light source at a light sensor based on the optical burst pattern and a nominal light level at the light sensor, and adjusts the optical output of the light source based on the lighting contribution.

In another embodiment, the controller receives information about the nominal light level and information about a target light level, and determines a difference between the nominal light level and the target light level. The controller then calculates a change in the optical output of the light source based on the lighting contribution, and adjusts the optical output of the light source to reach the target level.

Other exemplary embodiments may be described below.

BRIEF DESCRIPTION OF THE FIGURES

These and other features, aspects, and advantages of the present disclosure are better understood when the following Detailed Description is read with reference to the accompanying drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
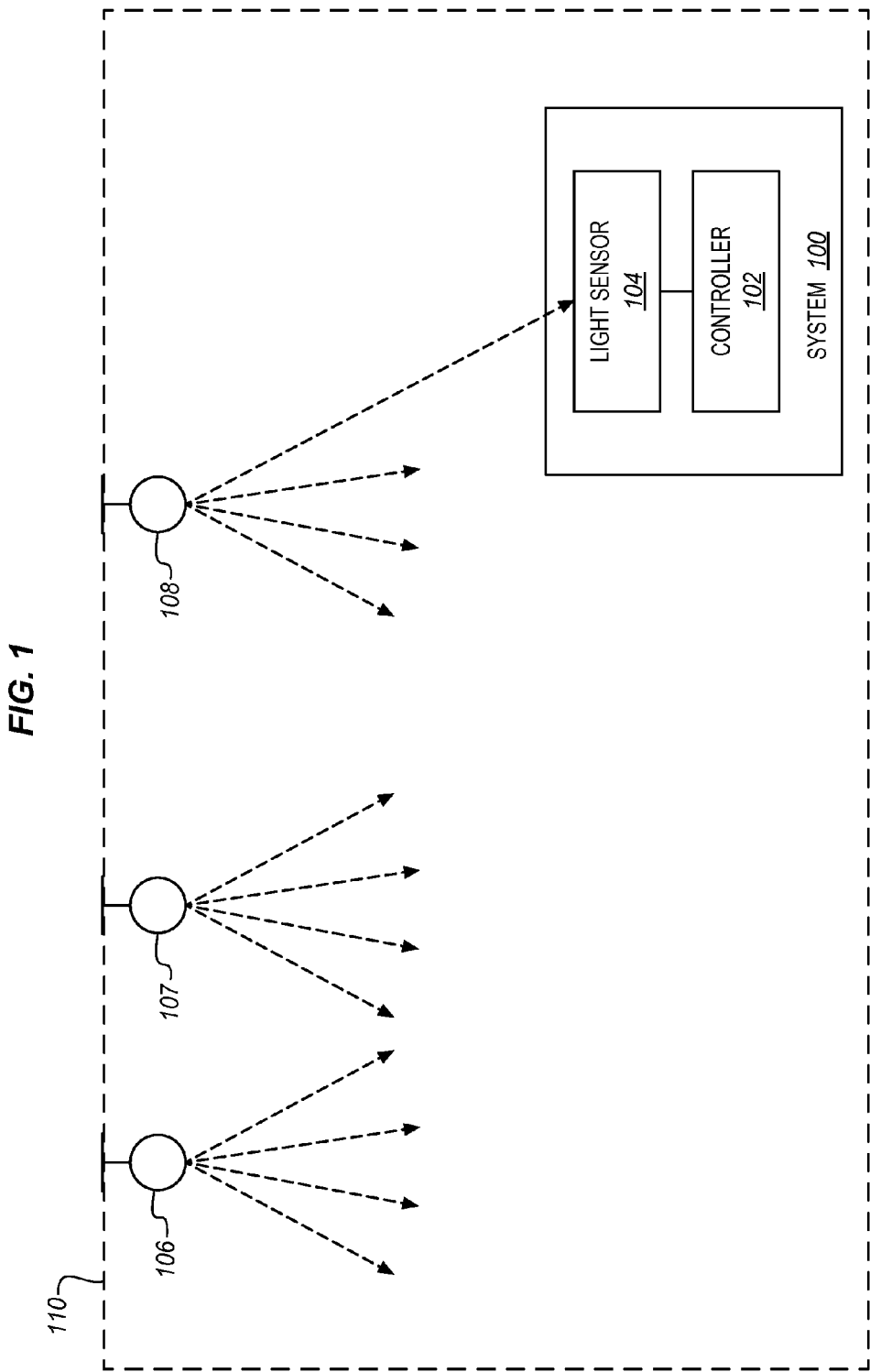
FIG. 1 is a block diagram of a lighting system and one or more light fixtures in an exemplary embodiment.

FIG. 1 is a block diagram of a lighting system 100 and one or more light fixtures 106-108 in an exemplary embodiment. Light fixtures 106-108 generate visible light (illustrated as dashed lines in FIG. 1) for an environment 110, and may generate light by various technological means, such as Light Emitting Diodes (LEDs), incandescent bulbs, fluorescent based systems, etc. In this embodiment, one or more light fixtures 106-108 generate optical burst patterns in their optical output. The optical burst patterns are imperceptible to the human eye, but are detectable by system 100. System 100 then determines a lighting contribution to environment 110 from one or more light fixtures 106-108 based on the detected optical bursts. Based on the lighting contributions from light fixtures 106-108, system 100 may perform various activities to control lighting within environment 110, such as modifying the optical output of one or more of light fixtures 106-108.

In this embodiment, system 100 includes a controller 102 and a light sensor 104. Generally, controller 102 includes any component, system, or device that is operable to determine the lighting contributions from one or more light fixtures 106-108 in environment 110. Light sensor 104 includes any component, system, or device that is operable to measure visible light levels. The light levels measured by light sensor 104 may be generated by artificial (e.g., light fixtures 106-108) or natural (i.e., sunlight) light sources. Light sensor 104 may include photo-resistive based sensors, Charged Coupled Devices (CCDs), photodiodes, photovoltaic cells, or other types of optical detectors as a matter of design choice. When measuring light levels, light sensor 104 may generate an analog output (e.g., voltage or current) representative of the measurement, a digital output representative of the measurement, etc. How system 100 may operate will be discussed in more detail with regard to FIG. 2.

Figure 2:
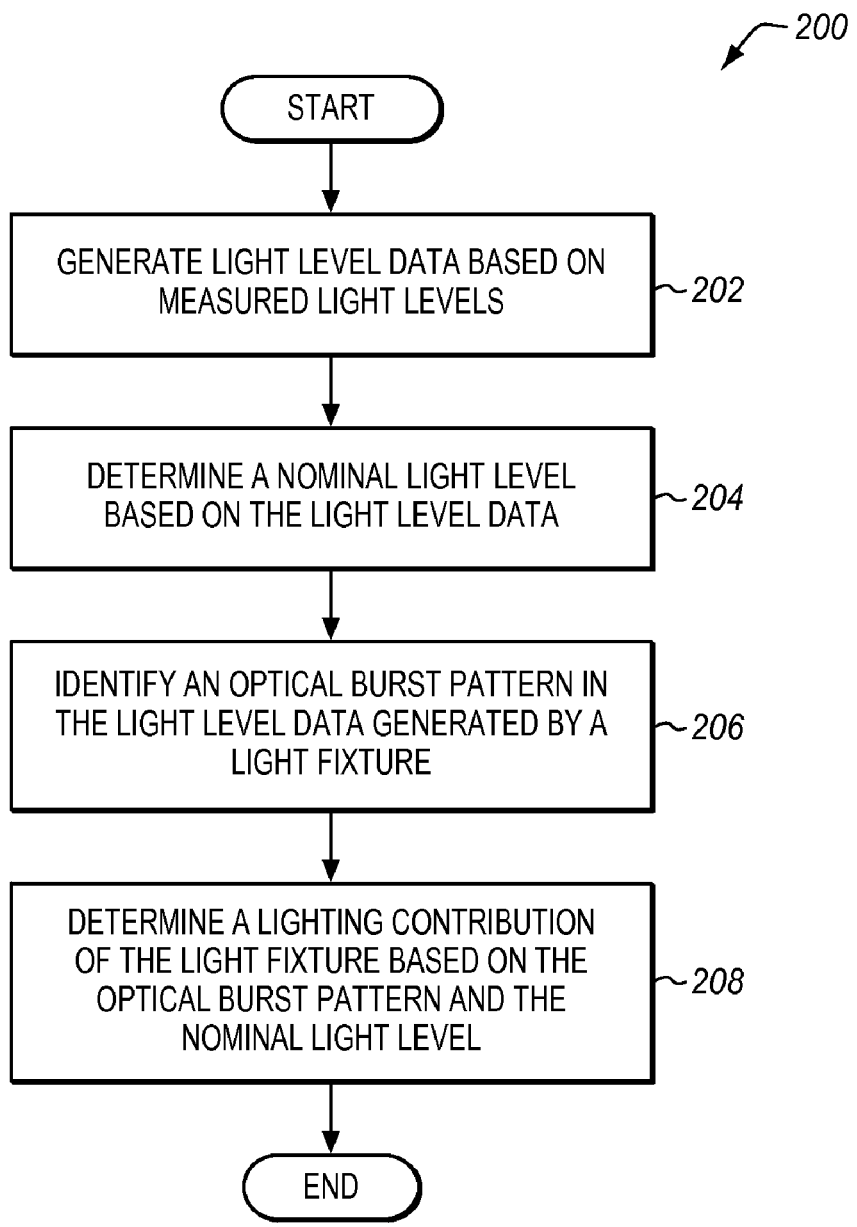
FIG. 2 is a flowchart illustrating a method of determining lighting contributions of one or more light fixtures in an exemplary embodiment.

FIG. 2 is a flowchart illustrating a method 200 for determining lighting contributions from one or more light fixtures 106-108 in an exemplary embodiment. The steps of method 200 will be described with respect to system 100 of FIG. 1, although one skilled in the art will understand that method 200 may be performed by other systems not shown. The steps of the flowcharts described herein are not all inclusive and may include other steps not shown. The steps may also be performed in an alternate order.

In step 202, light sensor 104 generates light level data based on measured light levels. Light sensor 104 may be placed at any position within environment 110 as a matter of design choice. For example, light sensor 104 may be placed at a person's workspace to measure light levels at the workspace, may move along with a person within environment 110, etc.

In step 204, controller 102 determines a nominal light level based on the light level data. Determining the nominal light level may be performed by controller 102 in a number of different ways, such as through the application of digital filters (e.g., moving average filters, Finite Impulse Response (FIR) filters, Infinite Impulse Response (IIR) filters, notch filters, etc.), analog circuits applied to the light level data, etc. For example, controller 102 may read a data stream of digital light level values from light sensor 104 over time, and apply a notch filter to the data stream when determining the nominal light level in order to remove narrow band noise from the light level data.

Figure 3:
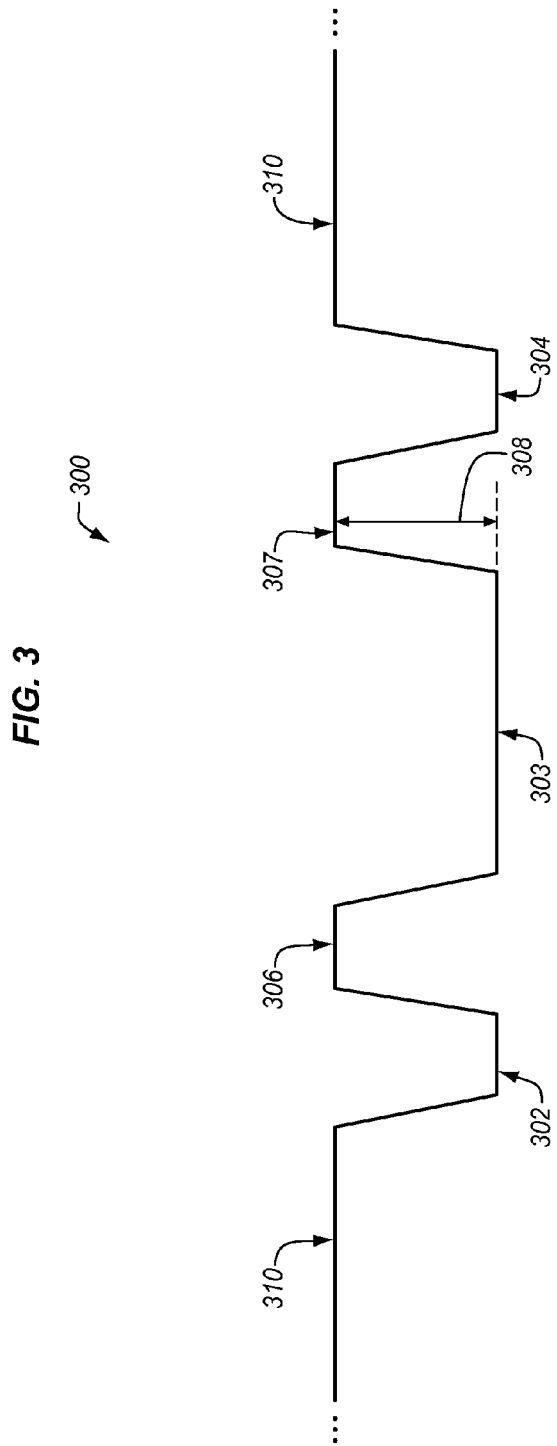
FIG. 3 is an example of an optical burst pattern generated by one or more light fixtures in an exemplary embodiment.

In step, 206, controller 102 identifies an optical burst pattern in the light level data generated by one or more light fixtures 106-108. The optical burst pattern in the optical output of one or more light fixtures 106-108 may be a series of full off or partial off, a series of full on or partial on states, or some combination of the states. Generally, the optical burst pattern is imperceptible to an observer within environment 110. The optical burst pattern may be imperceptible because the rate of the burst pattern is too fast for the observer to notice and/or because the amplitude modulation of the optical output is too small for the observer to notice. FIG. 3 is an example of an optical burst pattern 300 generated by one or more light fixtures 106-108 in an exemplary embodiment. In this embodiment, optical burst pattern 300 includes one or more amplitude modulations for an optical output of light fixtures 106-108. Optical burst pattern 300 in FIG. 3 illustrates examples of optical off pulses 302-304 and optical on pulses 306-307 generated by light fixtures 106-108. Optical burst pattern 308 also illustrates a level 310 representative of the nominal light level. Off pulses 302-304 are generated when an optical output of one of light fixtures 106-108 decreases from a previous level (e.g., a fixture is temporarily turned off or partially off). On pulses 306-307 may be generated as the fixture output returns to its previous output level (e.g., some partial output level or a full power output level). In some embodiments, optical burst pattern 300 may encode information that uniquely identifies a particular one of light fixtures 106-108.

Encoding information in the optical burst patterns may be performed by generating a sequence of on-off pulses in the optical burst that digitally encode the identifiers.

In step 208, controller 102 determines a lighting contribution of one or more light fixtures 106-108 based on the optical burst pattern and the nominal light level. For example, a lighting contribution may be related to a change in amplitude 308 of the measured light levels during off pulses 302-304 as compared to the nominal light level (e.g., level 310 of FIG. 3) determined in step 204.

By advantageously determining how different light fixtures 106-108 contribute to lighting in environment 110, various activities may be performed more efficiently. For instance, system 100 may determine that light fixture 106 contributes very little to the present lighting at light sensor 104, perhaps due to light fixture 106 being far away from light sensor 104. Thus, it would be less efficient to operate light fixture 106 at a high power level when attempting to increase the lighting level at light sensor 104. In contrast, another lighting fixture may be able to contribute more lighting at light sensor 104 utilizing a similar and/or lower power level.

In some embodiments, controller 102 may determine the power utilized by one or more light fixtures 106-108 when generating a corresponding optical output. Controller 102 may transmit commands to light fixtures 106-108 requesting the information, and in response, receive the power utilization information. The power utilization information sent by light fixtures 106-108 may be transmitted optically (e.g., by modulating a corresponding optical output of a fixture to encode the information), wirelessly, etc. In this embodiment, controller 102 may calculate the efficiency of light fixtures 106-108 based on their lighting contributions and their power utilization. When the efficiency of light fixtures 106-108 is known, controller 102 may then calculate a change in the optical output for one of fixtures 106-108 to reach a target light level at light sensor 104. This allows system 100 to control the lighting in environment 110 more accurately.

Figure 4:
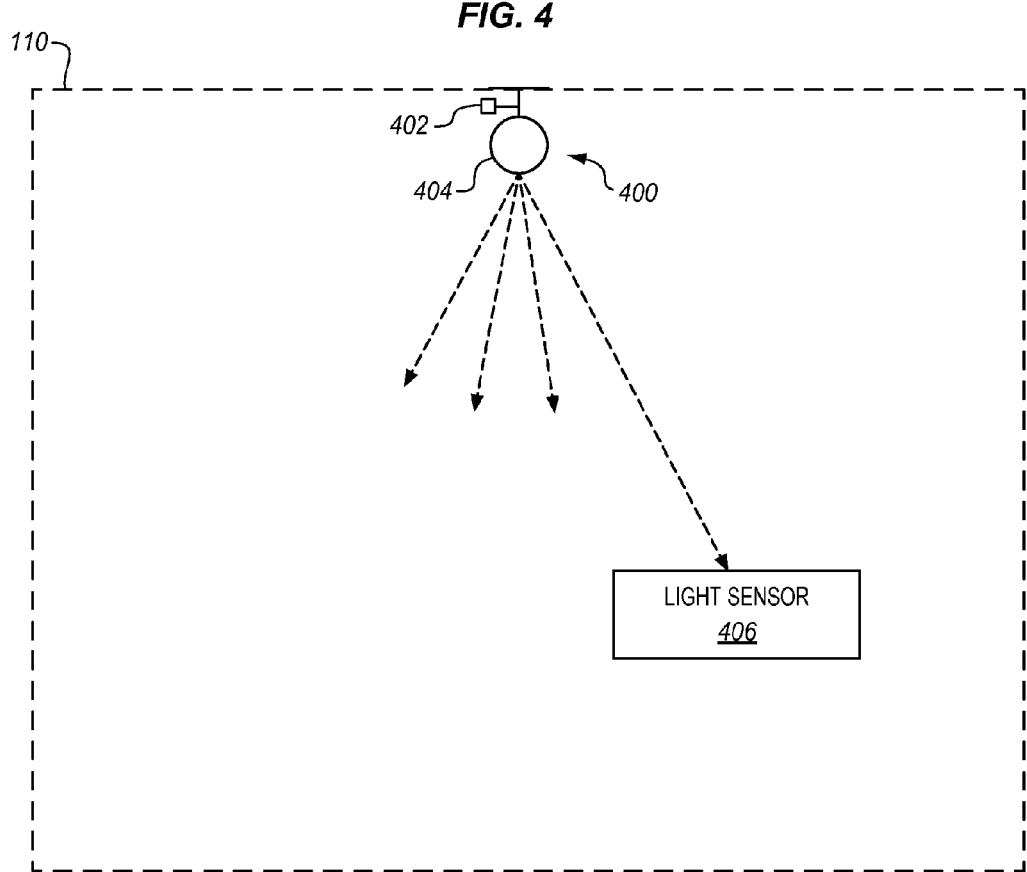
FIG. 4 is a block diagram of a light fixture in an exemplary embodiment.

FIG. 4 is a block diagram of a light fixture 400 in an exemplary embodiment. In this embodiment, light fixture 400 includes a controller 402 and a light source 404. In light fixture 400, controller 402 includes any component, system, or device that is operable to modulate an optical output of light source 404 to generate optical burst patterns. Controller 402 may then receive information about the lighting contribution of light source 404, and adjust the optical output of light source 404 to control the lighting in environment 110. In some embodiments, light fixture 400 may receive information about the lighting contribution of light source 404 at a remote light sensor, such as light sensor 406. Such information may be received by light fixture 400 over a wireless interface (e.g., radio, optical, etc.) and/or a wired interface. Light source 404 includes any component, system, or device that is operable to provide lighting to environment 110. Light source 404 may include artificial and natural sources of light. One example of light source 404 as a natural source of light is a window. In this example, the window may include a variable opacity thin film that modulates an intensity of natural lighting provided to environment 110. How system 400 may operate will be discussed in more detail with regard to FIG. 5.

Figure 5:
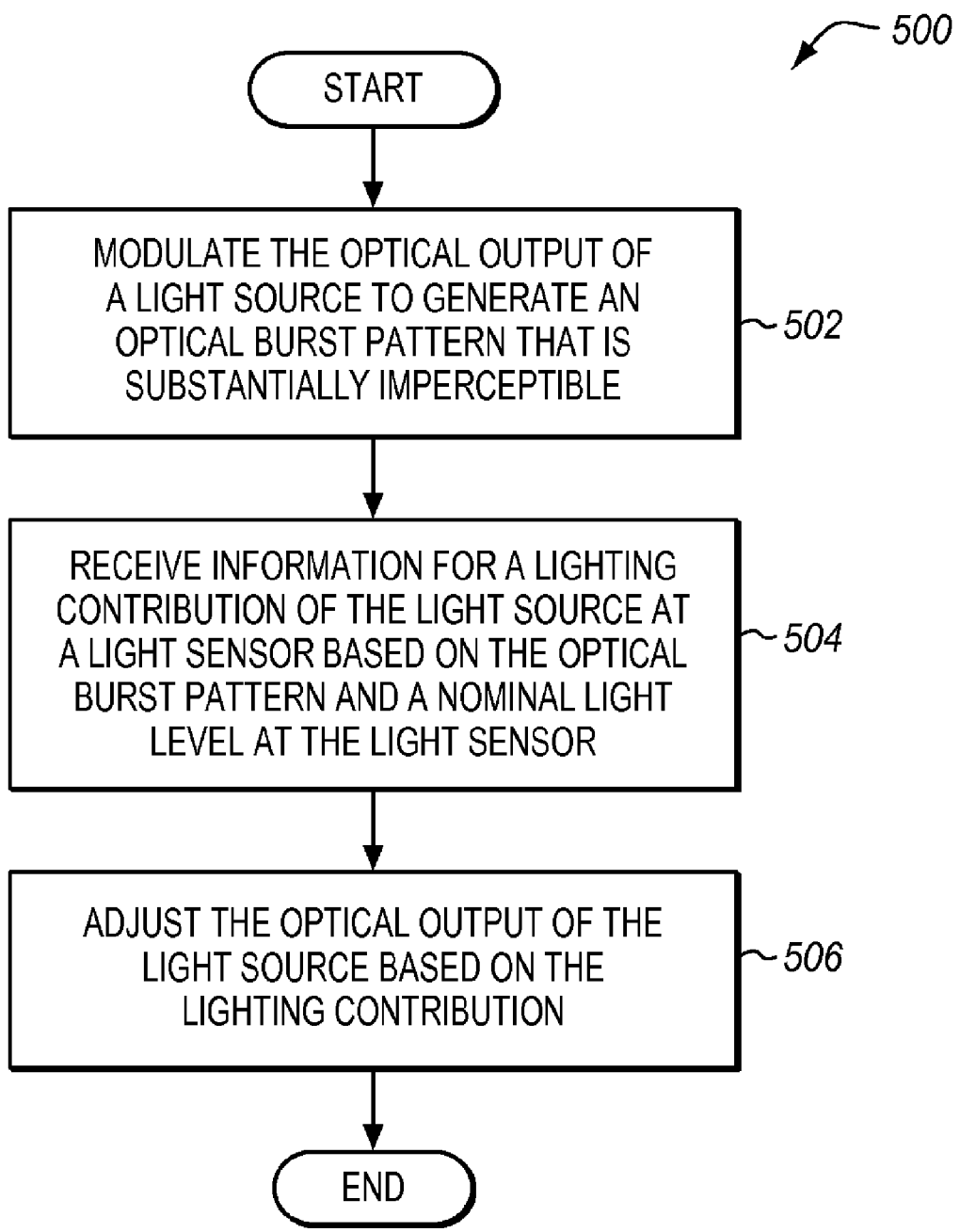
FIG. 5 is a flow chart illustrating a method of coordinating lighting for an environment in an exemplary embodiment.

FIG. 5 is a flow chart illustrating a method 500 for coordinating lighting for environment 110 in an exemplary embodiment. The steps of method 500 will be described with respect to light fixture 400 of FIG. 4, although one skilled in the art will understand that method 500 may be performed by other systems not shown.

In step 502, controller 402 modulates an optical output of light source 404 to generate an optical burst pattern that is substantially imperceptible to an observer. Controller 402 may perform an amplitude modulation of the optical output of light source 404 to generate a burst pattern at a high frequency. For instance, controller 402 may modulate the optical output of light source 404 to generate optical pulses of less than about 400 microseconds, which may be substantially imperceptible to most observers. Controller 402 may modulate the optical output of light source 404 in a variety of ways, such as varying a current to light source 404, varying opacity of a thin film applied to a surface of light source 404, etc.

In step 504, controller 402 receives information for a lighting contribution of light source 404 at a light sensor 406 based on the optical burst pattern and a nominal light level at light sensor 406. For example, a control system (not shown in FIG. 4) coupled with light sensor 406 may analyze the burst pattern generated in step 502 and compare the burst pattern to a nominal lighting level measured by light sensor 406. The control system may then transmit information about the lighting contribution of light source 404 to controller 402.

In step 506, controller 402 adjusts the optical output of light source 404 based on the lighting contribution information received in step 504.

In some embodiments, controller 402 may receive information about the nominal lighting level measured at light sensor 406, and a target lighting level for environment 110. Controller 402 may then determine a difference between the nominal light level and the target light level, and calculate a change in the optical output of light source 404 based on the lighting contribution of light source 404 at light sensor 406. Controller 402 may then adjust light source 404 to reach the target level.

In other embodiments, controller 402 may receive a list of light fixtures and their associated efficiencies. Controller 402 may then apply various control algorithms to vary the optical output of light source 404 based on an efficiency of light source 404 and/or the efficiencies of other light sources.

Examples

Figure 6:
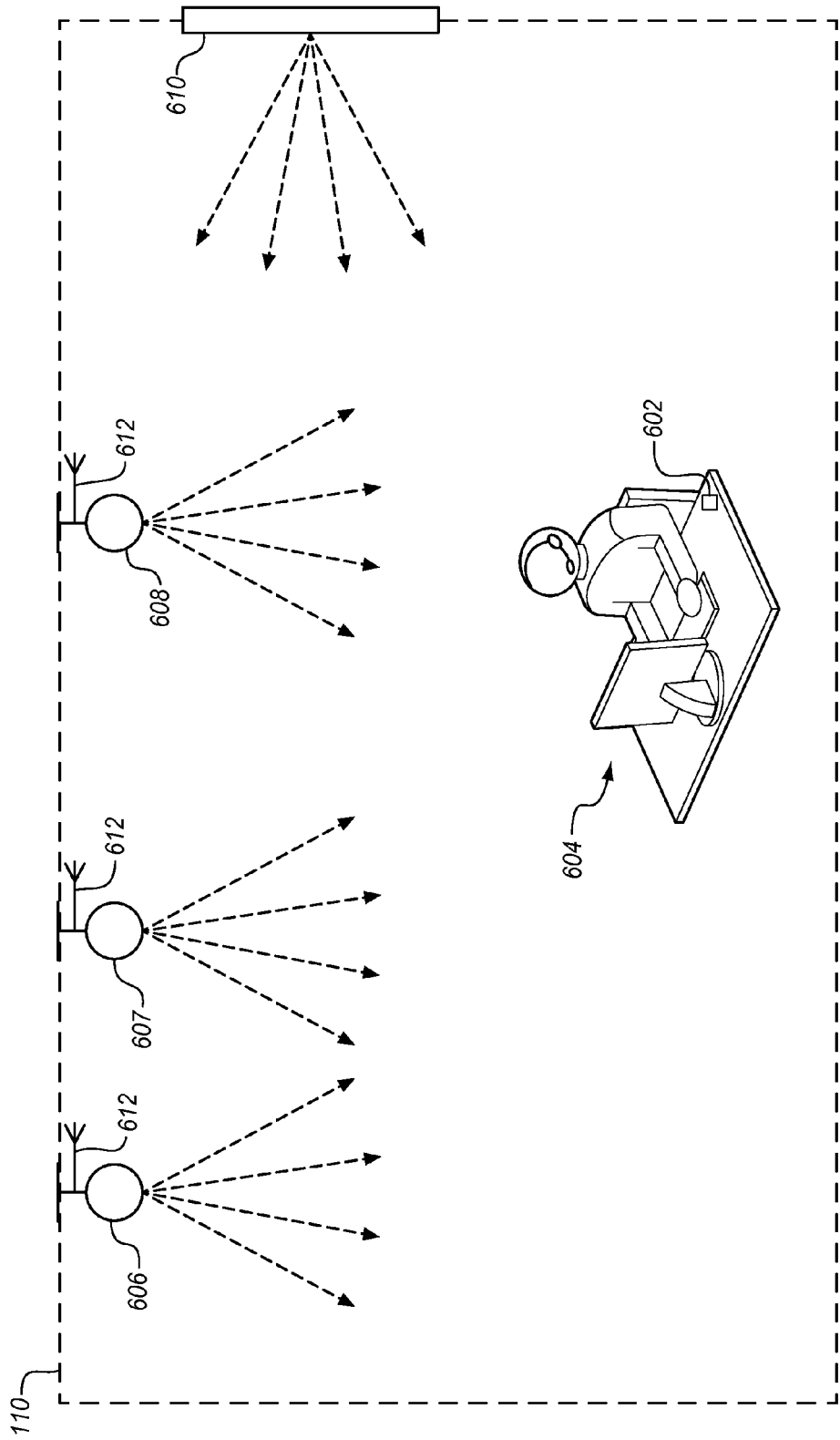
FIG. 6 is a block diagram of a lighting controller in an exemplary embodiment.

A first example is shown in FIG. 6, which is a block diagram of a lighting controller 602 in an exemplary embodiment. In addition to lighting controller 602, FIG. 6 illustrates light fixtures 606-608 as sources of artificial light for environment 110, and a window 610 as a source of natural light for environment 110. In FIG. 6, lighting controller 602 is located proximate to a person's workspace 604.

Over time, the amount of natural light provided by window 610 to workspace 604 changes. When light fixtures 606-608 provide a fixed amount of artificial light during the same time period, this results in a variable amount of lighting at workspace 604. This can be an inefficient use of the lighting available in environment 110. Controller 602 solves this problem by dynamically adjusting the amount of artificial light at workspace 604. In this embodiment, light fixtures 606-608 generate optical burst patterns in their optical output that are detected by controller 602. Controller 602 also detects an amount of lighting present at workspace 604. By determining an amount of artificial light provided by light fixtures 606-608 at workspace 604, controller 602 can dynamically determine the artificial lighting contributions and the natural lighting contributions at workspace 604. Controller 602 may determine the contributions of light fixtures 606-608 by comparing an average light level measured at controller 602 with the burst patterns generated by light fixtures 606-608. Controller 602 may then transmit commands to one or more light fixtures 606-608, or directly control the optical output of one or more light fixtures 606-608 to compensate for changes in the lighting provided by window 610. For instance, if window 610 temporarily provides more lighting to workspace 604, then controller 602 in concert with light fixtures 606-608 may reduce the optical output of one or more light fixtures 606-608. This advantageously utilizes the natural lighting available in environment 110 more efficiently and also reduces the power utilized by light fixtures 606-608. In the converse, if window 610 temporarily provides less lighting to workspace 604, then controller 602 in concert with light fixtures 606-608 may increase the optical output of one or more light fixtures 606-608. This advantageously provides a substantially constant lighting at workspace 604 while still utilizing what natural light is available.

While in this example window 610 is discussed with regard to supplying a varying amount of natural light to environment 110 due to the typical outdoor lighting changes during the day, window 610 may be modified in some embodiments to include a variable opacity thin film. Similar to the thin films used to modulate opacity in liquid crystal display panels, a thin film applied to window 610 may be utilized to modulate the natural lighting available to environment 110. In a manner similar to generating burst patterns in artificial lighting, modifying window 610 with a thin film may also allow for generating burst patterns in the natural lighting provided by window 610 to environment 110, and for controlling the contribution of natural lighting provided by window 610. This may allow controller 602 to more accurately utilize the artificial and natural lighting available to environment 110.

Figure 7:
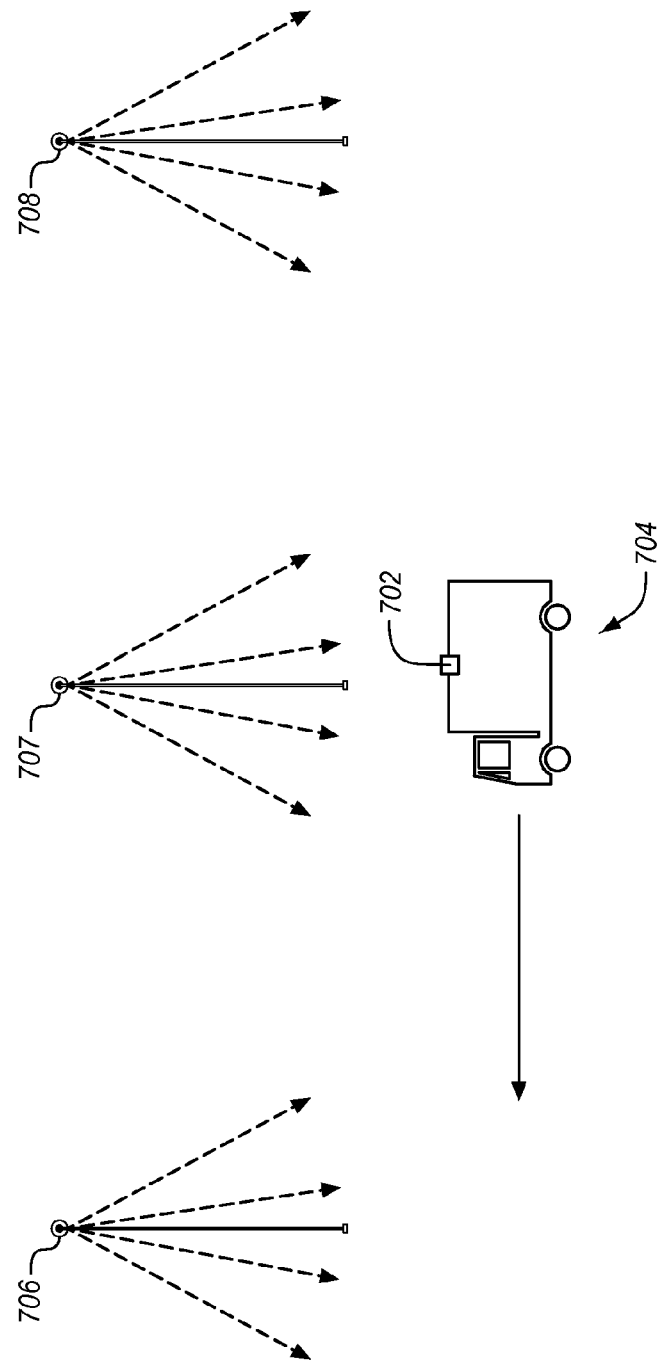
FIG. 7 is a block diagram of a lighting monitor in an exemplary embodiment.

A second example is shown in FIG. 7, which is a block diagram of a lighting monitor 702 in an exemplary embodiment. In the second example, lighting monitor 702 is mounted to a truck 704. Truck 704 is travelling in the direction indicated by the arrow in FIG. 7. More particularly, truck 704 travels past a number of street lights 706-708 to allow lighting monitor 702 to determine the lighting contributions of street lights 706-708.

One problem encountered by municipalities is the maintenance of street lighting. Typically, the optical output of a street light decreases over time as the bulbs age. As some low lighting threshold is reached for a particular street light, the bulb is replaced. In current practice, a municipal worker travels to each street light and uses a light meter to determine a light output for the light. This is time consuming and prone to errors. First, the worker may accidentally measure the optical output of the wrong light. This may result in unusual changes in the optical output data for a particular light over time. Second, the worker may accidentally measure the optical output of a particular street light at different distances over time. This may result in the measurement changing over time due to changes in the distance, which may be interpreted that it is time for a bulb replacement. Controller 702 in concert with street lights 706-708 solves these problems by measuring optical burst patterns generated by street lights 706-708 to determine the contributions of street lights 706-708 as truck 704 travels. More specifically, when street lights 706-708 generate optical burst patterns that include unique identifiers, then controller 702 may automatically log lighting contributions for each of street lights 706-708 using the identifiers by merely driving truck 704 around the municipality. This reduces the opportunity for measuring the wrong light when measuring lighting contributions for street lights 706-708. Further, if truck 704 is equipped with location based services, such as a Global Positioning System (GPS) receiver, then controller 702 in concert with the GPS receiver may not only capture and log lighting contributions for street lights 706-708, but also log location based information during the analysis of the lighting contributions for street lights 706-708. The location based information may then be used to normalize the lighting contributions for street lights 706-708 based on a distance between truck 704 and each of street lights 706-708. This reduces the opportunity for distance based measurement errors that mimic changes in the optical output of street lights 706-708 over time.

Figure 8:
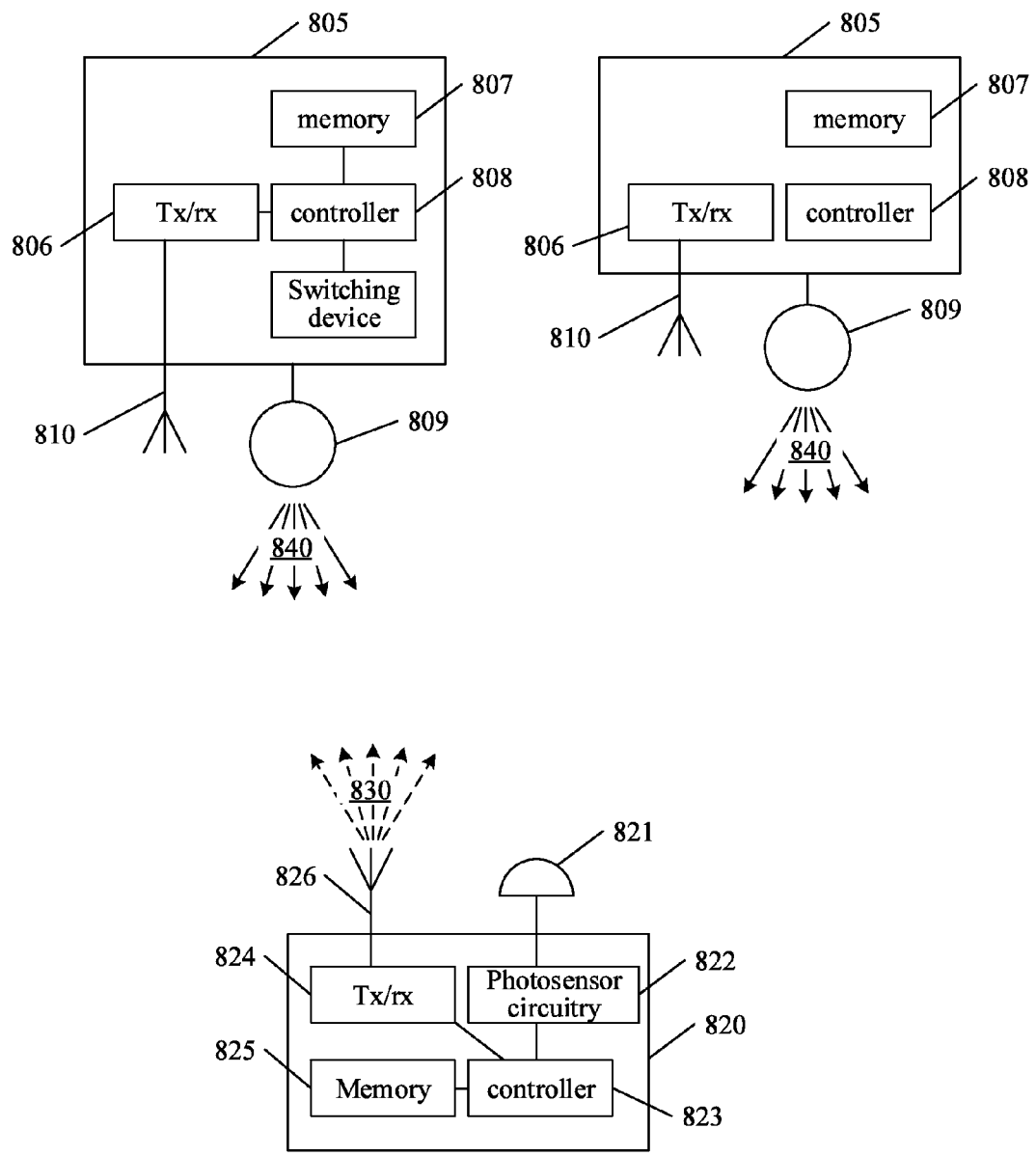
FIG. 8 is a block diagram of light fixtures in communication with a light sensor according to some embodiments of the invention.

Embodiments of the invention, as shown in the block diagram in FIG. 8, include auto commissioning a plurality of fixtures 805 in communication with light sensor 820 through wireless communication channel 830. As shown, fixtures 805 and light sensor 820 are located remotely relative to one another. Moreover, fixtures 805 do not include a light sensor, photo sensor, or photodiode. Fixtures 805 can include transceiver 806, memory 807, fixture controller 808, antenna 810 and/or light source 809. Fixture controller 808 can be communicatively coupled with transceiver 806, memory 807, and/or light source 809. Light sensor 820 can include transceiver 824, memory 825, light sensor controller 823, antenna 826, photosensor 821 and/or photosensor circuitry 822. Light sensor controller 823 can be communicatively coupled with memory 825, transceiver 824, and/or photosensor circuitry 822 (and/or photosensor 821).

Fixture controller 808 can be programed, for example, with a program stored in memory 807, to modulate the light emitted from light source 809 to encode a burst pattern that includes a fixture identifier and/or that is humanly imperceptible. In some embodiments, the light is modulated in response to receiving instructions from light sensor 820 to do so through transceiver 806 and antenna 810. In some embodiments, the light fixture identifier can be an identifier assigned by light sensor 820. For instance, in order to lower the amount of data encoded, the light sensor can assign fixture 805 a temporary fixture identifier comprising two, three, four, five or six bits. In some embodiments, the light fixture identifier can be uniquely set for each fixture and saved in memory.

The burst pattern can include periods of time when fixture 805 emits light at a first luminance level and periods of time when fixture 805 emits light at a second luminance level that is less than the first luminance level. The burst pattern can include periods of time when fixture 805 emits light at the first luminance level and periods of time when fixture 805 does not emit any light. In some embodiments, the total amount of time light source 809 illuminates light at a second luminance level over a period of 500 microseconds is less than 300, 280, 260, 240, 220, 200, 180, 160, 140, 120, 100, 80, 60, 40, or 20 microseconds give or take 5 microseconds.

In some embodiments, during transmission of a burst pattern the total amount of time light source 809 illuminates light at a second luminance level over a period of about 2600 microseconds (give or take 100 microseconds) is less than 400, 380, 360, 340, 320, 300, 280, 260, 240, 220, 200, 180, 160, 140, 120, 100, 80, 60, 40, or 20 microseconds give or take 5 microseconds.

In some embodiments, during transmission of a burst pattern the percentage of the amount of time light source 809 illuminates light at the second luminance level compared with the amount of time light source 809 illuminates light at the first luminance level is less than 70%, 65%, 60%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the percentage of the time integral of the amount of time light source 809 illuminates light at the first luminance level versus the second luminance level is less than 20%, 19%, 18%, 17%, 16%, 15%, 14%, 13%, 12%, 11%, 10%, 9%, 8%, 7%, 6%, 5%, 4%, 3%, 2.5%, 2%, 1.5%, 1%, or 0.5%.

In some embodiments, during transmission of a burst pattern the time integral of the periods of time when light source 809 (e.g., light emitting diode) emits light at a second luminance level (or the first luminance level) over a period of 500 microseconds is less than a predetermined value.

In some embodiments, during transmission of a burst pattern the time integral of the function of the luminance level over time of light source 809 (e.g., light emitting diode) over a period of time is less than 80%, 70%, 60%, 50%, 40%, 30%, 20%, 10%, or 5% of the greatest luminance level during the period of time times the period of time.

In some embodiments, the burst pattern is modulated using amplitude modulation, frequency modulation, phase-shift keying, frequency-shift keying, amplitude-shift keying, and/or quadrature amplitude modulation, on-off keying, continuous phase modulation, orthogonal frequency-division modulation, wavelet modulation, trellis modulation, spread spectrum modulation, pulse width modulation, pulse position encoding, etc.

In some embodiments, fixture 805 can include a semiconductor switching device coupled with the light source 809 and/or fixture controller 808. The burst pattern can be encoded by shorting or opening the semiconductor switching device to interrupt current to the light source and thus changes the illuminance from a first luminance level to a second luminance level. The semiconductor switching device can include a field-effect transistor (FET), for example, a MOSFET, JFET, etc.

Fixture 805 can also receive an adjustment value from light sensor 820 via transceiver 806 and antenna 810. In response, fixture controller 808 can modify the illuminance of light source 809 (e.g., light emitting diode) based on the adjustment value. That is, controller can increase or decrease the illuminance of light source 809 in response to receiving the adjustment value.

Light sensor controller 823 can be programmed, for example, with a program stored in memory 825, to receive the burst pattern from fixtures 805 through photosensor 821 and/or photosensor circuitry 822. Light sensor controller 823 may also associate the light fixture identifier with the light fixture. This can occur, for example, by associating the illumination light levels, light fixture identifier, temporary light fixture identifier, burst pattern, etc. in the database Light sensor controller can also send the adjustment value along with a fixture identifier to fixture 805 using transceiver 824. The adjustment value can be received through a user interface, a dial, switch, etc. In some embodiments, adjustment value and/or fixture identifiers can be broadcast to a plurality of fixtures using a table or other messaging format either singularly or as a package.

Light sensor controller 823 can receive a plurality of burst patterns from a plurality of fixtures 805. For instance, light sensor controller 823 can receive a first burst pattern from a first light source and a second burst pattern from a second light source through photosensor 821. The first burst pattern can include a first identifier associated with the first light source and the second burst pattern can include a second identifier associated with the second light source. The first identifier can be associated with the first light source and the second identifier can be associated with the second light source.

In some embodiments, the burst pattern may also include an illumination value that represents the illuminance or relative illuminance of the light source.

In some embodiments, light sensor controller 823 can determine the light contribution of each fixture 805. The light contribution can represent the light contribution of each of the plurality of light fixtures relative to a total light level detected at light sensor 820. In some embodiments, light sensor controller 823 can determine adjustment value based on the light contribution of each light fixture.

While wireless communication channel 830 is shown, communication between fixtures 805 and light sensor 820 can occur through any communication channel, for example, through a wired communication channel, through an optical communication channel, etc. Moreover, while fixtures 805 include transceiver 806, in some embodiments, fixtures 805 may include just a receiver. In such embodiments, fixtures 805 can transmit communication to light sensor 820 via optical bursts 840. Moreover, in such embodiments, light sensor 820 can include only a transmitter and may receive communication from fixtures 805 via optical bursts 840.

Figure 9:
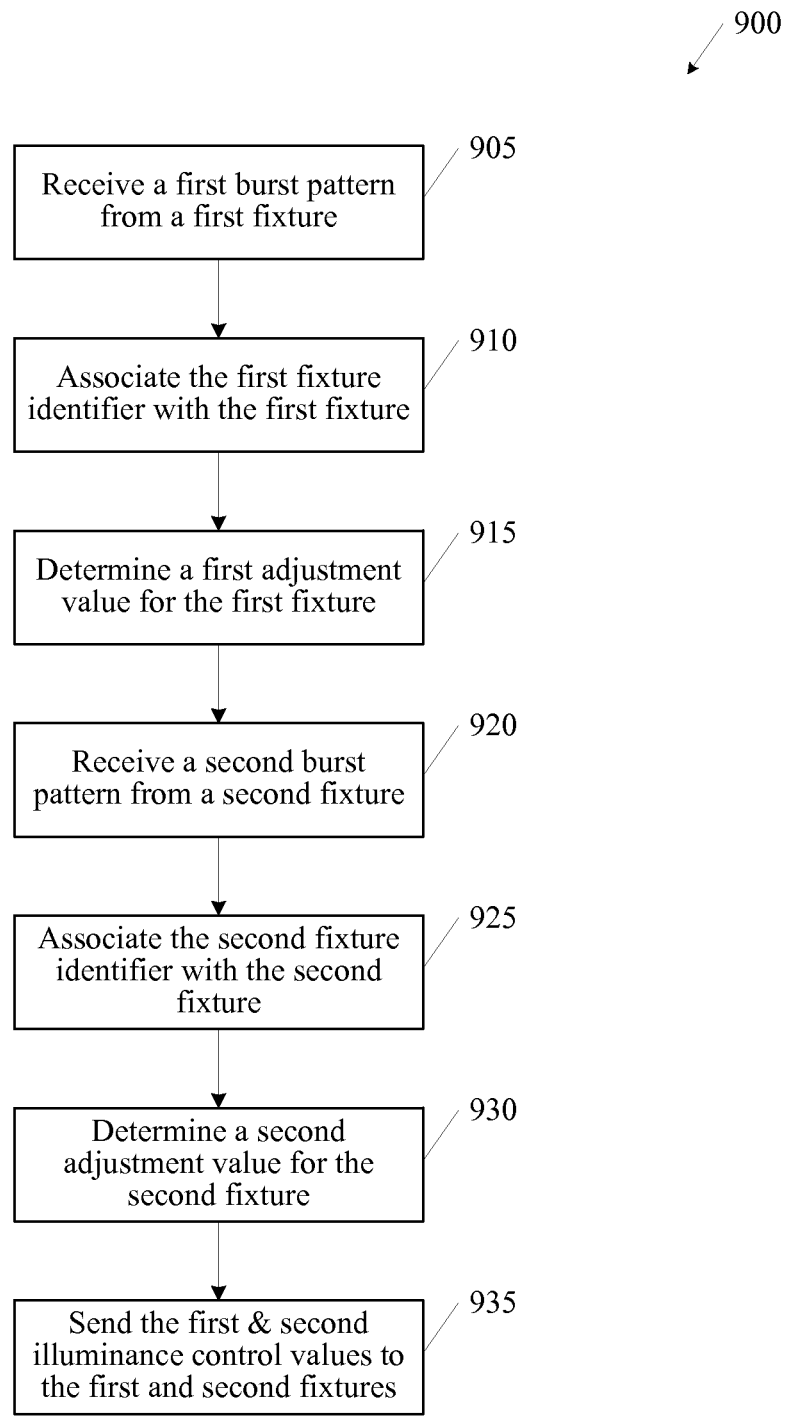
FIG. 9 is a flowchart of a process for auto commissioning fixtures with a light sensor according to some embodiments of the invention.

FIG. 9 is a flowchart of process 900 for auto commissioning fixtures with a light sensor according to some embodiments of the invention. Process 900 starts at block 905. Light sensor 820 receives a first burst pattern from a first light source at a first fixture. The first burst pattern can be received through photosensor 821 and/or via photosensor circuitry 822. The first burst pattern can include a first fixture ID and/or a first illumination level. Light sensor controller 823 in conjunction with photosensor 821 and/or photosensor circuitry may determine the illuminance level or fixture contribution of the first fixture based on the burst pattern. This can be done, for example, by comparing the illuminance levels when the burst pattern is asserted and when it is not asserted.

At block 910 the first fixture identifier can be associated with the first fixture and the illuminance of the first fixture. These values, for example, can be saved in a table in memory 825. At block 915 a first adjustment value can be determined. The first adjustment value can be determined from a function based on the fixture contribution, the first illumination level, and/or a user input illumination value.

At block 920, light sensor 820 receives a second burst pattern from a second light source at a second fixture. The second burst pattern can be received through photosensor 821 and/or via photosensor circuitry 822. The second burst pattern can include a second fixture ID and/or a second illumination level. Light sensor controller 823 in conjunction with photosensor 821 and/or photosensor circuitry may determine the illuminance level or fixture contribution of the second fixture based on the burst pattern. This can be done, for example, by comparing the illuminance levels when the burst pattern is asserted and when it is not asserted.

At block 910 the second fixture identifier can be associated with the second fixture and the illuminance of the second fixture. These values, for example, can be saved in a table in memory 825. At block 915 a first adjustment value can be determined. The first adjustment value can be determined from a function based on the fixture contribution, the first illumination level, and/or a user input illumination value.

At block 935 the first adjustment value and the second adjustment value may be sent to either or both the first fixture and/or the second fixture. These adjustment values can be sent together as a burst communication or separately.

An adjustment value, for example, can be determined as follows: A first effectiveness value of a first light fixture at a first sensor can be determined from the first light contribution value. If the first light contribution value is expressed as a ratio, then the first effectiveness value is equal to the first contribution value. If not, then first effectiveness value is set to the ratio of the first light contribution divided by the total light received at the first sensor. The second effectiveness value of the first light fixture at a second sensor can be determined in a similar fashion. The total effectiveness can be calculated as the sum of the first light effectiveness value and the second light effectiveness value. In embodiments with more light fixtures, all light efficiencies shall be summed. In some embodiments, the efficiencies can be calculated at the fixture or the sensor.

The adjustment value for the first fixture can be set as the first adjusted light value times the first effectiveness value plus the second adjusted light value times the second effectiveness value. Mathematically speaking, the adjustment at the first fixture can be expressed as:

$$A_1 = \sum_{i=1}^{n} E_1^i A^i,$$

where $A_1$ is the light adjustment value at the first fixture, $E_1^i$ is the effectiveness value of the first fixture at the $i^{th}$ sensor and $A^i$ is the light adjustment value at the $i^{th}$ sensor, and n is the number of sensors. And the effectiveness value, $E_1^i$, can be expresses as a function of the light delivery efficiency at each sensor:

$$E_1^i = \frac{F_1^i}{\sum_{j=1}^{m} F_j^i},$$

where $F_1^i$ is the light fixture efficiency of the first fixture at the $i^{th}$ sensor and m is the total number of fixtures. Thus, the light effectiveness value $E_1^i$ is a normalized value that is a function of the light produced from all the fixtures in communication with the sensor, but not ambient light from other light sources.

Figure 10:
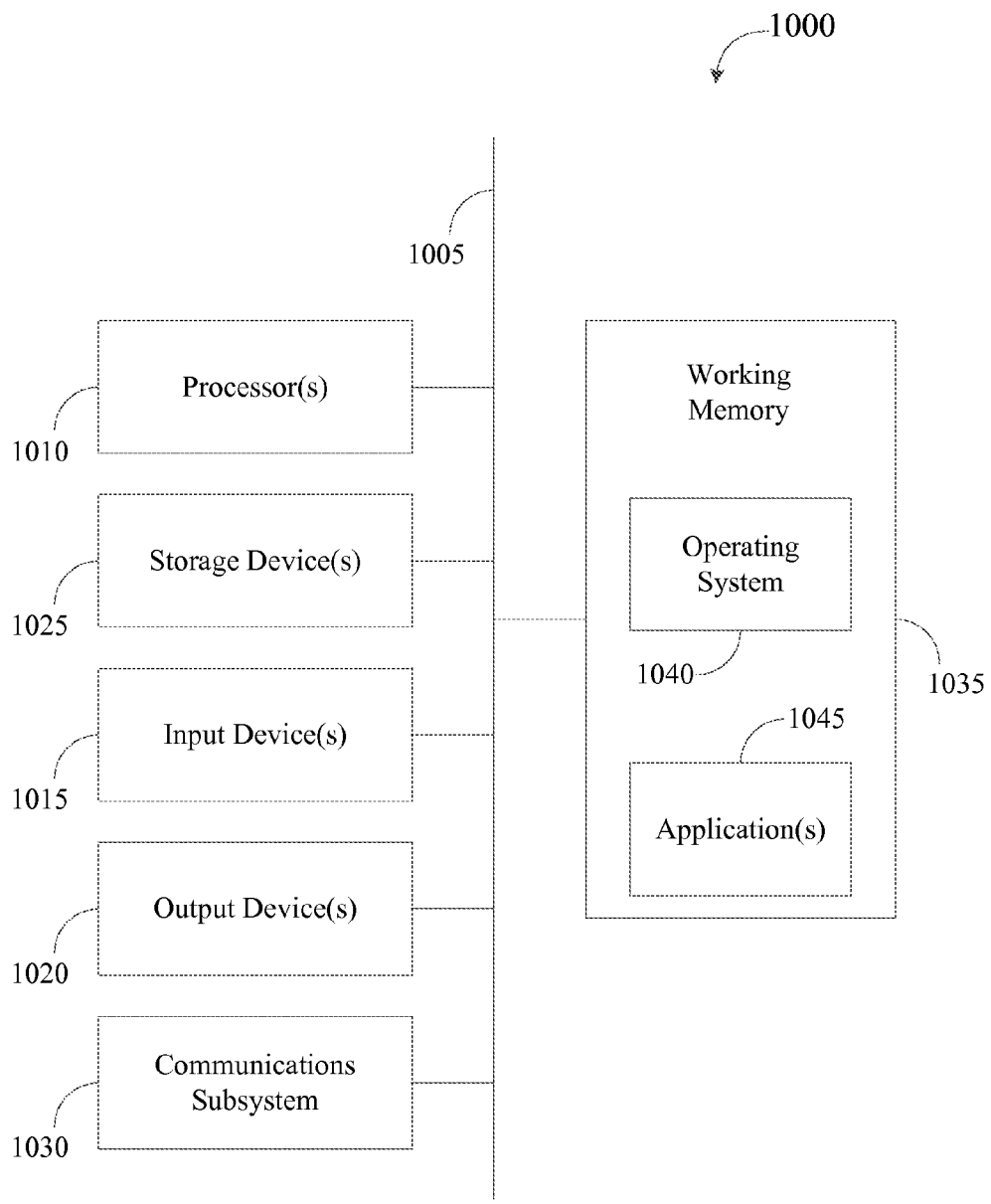
FIG. 10 shows an illustrative computational system for performing functionality to facilitate implementation of embodiments described herein.

The computational system 1000, shown in FIG. 10 can be used to perform any of the embodiments of the invention. For example, computational system 1000 can be used to execute methods 500 and/or 900. As another example, computational system 1000 can be used perform any calculation, identification and/or determination described here. Moreover, fixture controller 808 and/or light sensor controller 823 may include some or all the components of computational system 1000.

Computational system 1000 includes hardware elements that can be electrically coupled via a bus 1005 (or may otherwise be in communication, as appropriate). The hardware elements can include one or more processors 1010, including without limitation one or more general-purpose processors and/or one or more special-purpose processors (such as digital signal processing chips, graphics acceleration chips, and/or the like); one or more input devices 1015, which can include without limitation a mouse, a keyboard and/or the like; and one or more output devices 1020, which can include without limitation a display device, a printer and/or the like.

The computational system 1000 may further include (and/or be in communication with) one or more storage devices 1025, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1000 might also include a communications subsystem 1030, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1030 may permit data to be exchanged with a network (such as the network described below, to name one example), and/or any other devices described herein. In many embodiments, the computational system 1000 will further include a working memory 1035, which can include a RAM or ROM device, as described above.

The computational system 1000 also can include software elements, shown as being currently located within the working memory 1035, including an operating system 1040 and/or other code, such as one or more application programs 1045, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1025 described above.

In some cases, the storage medium might be incorporated within the computational system 1000 or in communication with the computational system 1000. In other embodiments, the storage medium might be separate from a computational system 1000 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1000 and/or might take the form of source and/or installable code, which, upon compilation and/or installation on the computational system 1000 (e.g., using any of a variety of generally available compilers, installation programs, compression/decompression utilities, etc.) then takes the form of executable code.

Any of the various elements shown in the figures or described herein may be implemented as hardware, software, firmware, or some combination of these. For example, an element may be implemented as dedicated hardware. Dedicated hardware elements may be referred to as "processors," "controllers," or some similar terminology. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

Although specific embodiments were described herein, the scope of the invention is not limited to those specific embodiments. The scope of the invention is defined by the following claims and any equivalents thereof.

That which is claimed:

1. An auto-commissioning lighting system comprising:
a light fixture comprising:
a light source;
a receiver; and
a fixture controller electrically coupled with the light source, wherein the controller is configured to modulate the light emitted from the light source to encode a burst pattern that is humanly imperceptible, wherein the burst pattern comprises a light fixture identifier; and
a light sensor configured to be disposed remotely within an architectural space relative to the light fixture, the light sensor comprising:
a photosensor;
a transmitter configured to communicate with the receiver of the light fixture; and
a light sensor controller electronically coupled with the photosensor and the transmitter, the light sensor controller configured to:
receive the burst pattern from the light fixture via the photosensor;
associate the light fixture identifier with the light fixture using the burst pattern;
determine an illuminance adjustment value for the light fixture from the burst pattern; and
send the illuminance adjustment value and the light fixture identifier to the receiver of the light fixture using the transmitter of the light sensor.

2. The auto-commissioning lighting system of claim 1, wherein the burst pattern comprises periods of time when a first luminance level and periods of time when the light emitting diode emits light at a second luminance level that is less than the first luminance level.

3. A light sensor providing auto-commissioning to an architectural space comprising:
a photosensor;
a communication interface configured to communicate with at least a first light source and second light source; and
a controller electronically coupled with the light sensor and the communication interface, the controller configured to:
receive a first burst pattern from a first light source from the photosensor, wherein the first burst pattern encodes a first identifier associated with the first light source;
associate the first identifier with the first light source;
determine a first illuminance adjustment value for the first light source based on the first burst pattern; and
send the first illuminance adjustment value to the first light source using the communication interface.

4. The light sensor according to claim 3, wherein the processor is further configured to:
receive a second burst pattern from a second light source from the photosensor, wherein the second burst pattern encodes a second identifier associated with the second light source;
associate the second identifier with the second light source;
determine a second illuminance adjustment value for the second light source based on the second burst pattern; and
send the second illuminance adjustment value to the second light source using the communication interface.

5. The light sensor according to claim 4, wherein the light sensor is configured to be positioned remotely relative to the first light source and the second light source.

6. The light sensor according to claim 4, wherein the first burst pattern is humanly imperceptible, and wherein the second burst pattern is humanly imperceptible.

7. The light sensor according to claim 4, wherein the first burst pattern encodes an illumination value associated with the first light source, and wherein the second burst pattern encodes an illumination value associated with the second light source.

8. The light sensor according to claim 4, wherein the process is further configured to determine the light contribution of the first light source and determining the light contribution of the second light source at the photosensor.

9. The light sensor according to claim 4, wherein the first adjustment value is determined based on a light contribution of the first light source, and wherein the second adjustment value is determined based on a light contribution of the second light source.

10. The light sensor according to claim 3, further comprising a user interface configured to receive the first adjustment value from the user, wherein the light sensor provides personal control to a user within the architectural space.

11. An auto-commissioning light fixture comprising:
a light emitting diode emitting light in the visual portion of the light spectrum; and a controller electrically coupled with the light emitting diode, wherein the controller is configured to:
modulate the light emitted from the light emitting diode to encode a first burst pattern comprising periods of time when the light emitting diode emits light at a first luminance level and periods of time when the light emitting diode emits light at a second luminance level that is less than the first luminance level,
wherein the total amount of time the light emitting diode illuminates light at the second luminance level over a period of 500 microseconds is less than 200 microseconds.

12. The auto-commissioning light fixture according to claim 11, further comprising memory communicatively coupled with the controller, wherein the first light source identifier is saved in the memory.

13. The auto-commissioning light fixture according to claim 11, further comprising a communication interface configured to receive adjustment value from a remote light sensor, wherein the controller is configured to modify the illuminance of the light emitting diode based on the adjustment value.

14. The auto-commissioning light fixture according to claim 11, wherein the first burst pattern encodes the first light source identifier using amplitude modulation.

15. The auto-commissioning light fixture according to claim 11, further comprising a semiconductor switching device coupled with the light emitting diode, wherein the first burst pattern is encoded by shorting or opening the semiconductor switching device which interrupts current to the light emitting diode and thus changes the illuminance from the first luminance level to the second luminance level.

16. The auto-commissioning light fixture according to claim 15, wherein the semiconductor switching device comprises a field-effect transistor.

17. An auto-commissioning light fixture comprising:
a light emitting diode emitting light in the visual portion of the light spectrum; and
a controller electrically coupled with the light emitting diode, wherein the controller is configured to:
modulate the light emitted from the light emitting diode to encode a first burst pattern comprising periods of time when the light emitting diode emits light at a first luminance level and periods of time when the light emitting diode emits light at a second luminance level that is less than the first luminance level,
wherein the percentage of time when the light emitting diode emits light at the second luminance level versus the first luminance level is less than 20%.

18. The auto-commissioning light fixture according to claim 17, further comprising a semiconductor switching device coupled with the light emitting diode, wherein the first burst pattern is encoded by shorting or opening the semiconductor switching device which interrupts current to the light emitting diode and thus changes the illuminance from the first luminance level to the second luminance level.

19. A method for auto commissioning comprising:
receiving a first burst pattern from a first light source at a light sensor, wherein the first burst pattern comprises periods of time when the first light source is illuminating light at a first luminance level and periods of time when the first light source is illuminating light at a second luminance level that is less than the first luminance level, wherein the periods of time when the first light source illuminates light at the second luminance level light is humanly imperceptible, and wherein the first burst pattern comprises a first light source identifier;
associating the first light source identifier with the first light source based on the first burst pattern;
determining a first illuminance adjustment value for the first light source based on the first burst pattern; and
sending the first illuminance adjustment value to a first light source.

20. The method according to claim 19, further comprising determining the distance between the light sensor and the first light source, wherein the first adjustment value is modified based on the distance between the light sensor and the first light source.

21. The method according to claim 19, further comprising:
receiving a second burst pattern from a second light source at a light sensor, wherein the second burst pattern comprises periods of time when the second light source is illuminating light at a first luminance level and periods of time when the second light source is illuminating light at a second luminance level that is less than the first luminance level, wherein the periods of time when the second light source illuminates light at the second luminance level light is humanly imperceptible, and wherein the second burst pattern comprises a second light source identifier;
associating the second light source identifier with the second light source based on the second burst pattern;
determining a second illuminance adjustment value for the second light source based on the second burst pattern; and
sending the second adjustment value to a second light source.

22. The method according to claim 19, wherein the second luminance level comprises zero lumens per square meter.

23. The method according to claim 19, wherein the light sensor and the first light source are configured to be positioned remotely relative to one another.

24. The method according to claim 19, wherein the total amount of time the first light source illuminates light at a second luminance level over a period of 500 microseconds is less than 200 microseconds.

25. The method according to claim 19, wherein the first burst pattern encodes the first light source identifier using amplitude modulation.

26. The method according to claim 19, wherein the wherein the first burst pattern encodes the first light source identifier using frequency modulation.

* * * * *